US011087487B2

(12) United States Patent
Snoke et al.

(10) Patent No.: US 11,087,487 B2
(45) Date of Patent: Aug. 10, 2021

(54) OBSCURATION MAP GENERATION

(71) Applicant: Northrop Grumman Systems Corporation, Falls Church, VA (US)

(72) Inventors: Sean Snoke, Schaumburg, IL (US); John Baader, Buffalo Grove, IL (US); Mark R. Trandel, Barrington, IL (US); Jaime E. Ochoa, Oak Lawn, IL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 16/170,394

(22) Filed: Oct. 25, 2018

(65) Prior Publication Data
US 2020/0134854 A1    Apr. 30, 2020

(51) Int. Cl.
*G06T 7/73* (2017.01)
*H04N 5/225* (2006.01)
*H04N 5/232* (2006.01)
*H04N 13/239* (2018.01)
*G01S 7/495* (2006.01)
*G06T 7/13* (2017.01)

(52) U.S. Cl.
CPC ............... *G06T 7/73* (2017.01); *G01S 7/495* (2013.01); *G06T 7/13* (2017.01); *H04N 5/2253* (2013.01); *H04N 5/23299* (2018.08); *H04N 13/239* (2018.05); *G06T 2207/10012* (2013.01); *G06T 2207/30212* (2013.01)

(58) Field of Classification Search
CPC ... G06T 7/73; G06T 7/13; G06T 2207/10012; G06T 2207/30212; H04N 13/239; H04N 5/23299; H04N 5/2253; G01S 7/495
See application file for complete search history.

(56) References Cited

U.S. PATENT DOCUMENTS

| | | | |
|---|---|---|---|
| 6,894,818 B1 | 5/2005 | Cicchiello et al. | |
| 7,202,776 B2 | 4/2007 | Breed | |
| 7,250,915 B2 | 7/2007 | Nelson | |
| 7,378,626 B2 | 5/2008 | Fetterly | |
| 7,385,768 B2 | 10/2008 | Wo et al. | |
| 7,920,255 B2 | 4/2011 | Aphek et al. | |
| 7,982,777 B2 * | 7/2011 | Prechtl | H04N 13/194 348/211.11 |
| 8,004,558 B2 * | 8/2011 | Prechtl | H04N 5/23299 348/48 |

(Continued)

FOREIGN PATENT DOCUMENTS

| | | |
|---|---|---|
| EP | 2811315 A1 | 12/2014 |
| EP | 3064899 A1 | 9/2016 |

OTHER PUBLICATIONS

Aircraft Survivability, Vulnerability Reduction, Published by the Joint Aircraft Survivability Program Office, Spring 2011, 33 pages.

*Primary Examiner* — Nasim N Nirjhar
(74) *Attorney, Agent, or Firm* — Edell, Shapiro & Finnan, LLC

(57) ABSTRACT

A camera is arranged on a transmitter or receiver mount configured to provide a transmitter or receiver with a field of regard. Image data of the field of regard is captured by the camera. A location of an obscuration within the field of regard from the image data is determined from the image data. A map of obscurations within the field of regard is generated based upon the image data and the location of the obscuration within the field of regard.

19 Claims, 9 Drawing Sheets

(56) References Cited

U.S. PATENT DOCUMENTS

| | | | |
|---|---|---|---|
| 8,279,429 B2 | 10/2012 | Aphek et al. | |
| 8,487,926 B2 | 7/2013 | Lee et al. | |
| 8,532,368 B2 | 9/2013 | Se et al. | |
| 8,699,005 B2 | 4/2014 | Likholyot | |
| 8,699,787 B2 | 4/2014 | van den Hengel et al. | |
| 10,223,591 B1 * | 3/2019 | Goldenberg | H04N 5/91 |
| 2003/0142005 A1 | 7/2003 | Bar-Avi et al. | |
| 2005/0069325 A1 | 3/2005 | Cicchiello et al. | |
| 2006/0132753 A1 * | 6/2006 | Nichols | G01S 13/865 |
| | | | 356/5.07 |
| 2007/0205366 A1 * | 9/2007 | Gidseg | F41G 7/224 |
| | | | 250/348 |
| 2007/0206177 A1 | 9/2007 | Anschel et al. | |
| 2007/0259619 A1 | 11/2007 | Beadle et al. | |
| 2009/0051906 A1 | 2/2009 | Carter et al. | |
| 2009/0315978 A1 | 12/2009 | Wurmlin et al. | |
| 2011/0188031 A1 | 8/2011 | Aphek et al. | |
| 2012/0213513 A1 | 8/2012 | Chao | |
| 2012/0298748 A1 | 11/2012 | Factor et al. | |
| 2013/0082183 A1 | 4/2013 | Mudge | |
| 2013/0127851 A1 * | 5/2013 | Richards, Jr. | G06T 17/00 |
| | | | 345/420 |
| 2013/0308004 A1 | 11/2013 | Liu et al. | |
| 2016/0073089 A1 | 3/2016 | Ting et al. | |
| 2016/0258759 A1 | 9/2016 | Matthews | |
| 2016/0337635 A1 | 11/2016 | Nisenzon | |
| 2017/0155888 A1 * | 6/2017 | Prechtl | G06T 7/593 |
| 2018/0164117 A1 * | 6/2018 | Sakaguchi | G01C 21/3611 |
| 2018/0293909 A1 * | 10/2018 | Lechner | G09B 9/003 |
| 2019/0058870 A1 * | 2/2019 | Rowell | G06T 7/85 |
| 2019/0068829 A1 * | 2/2019 | Van Schoyck | G01C 21/165 |
| 2019/0256224 A1 * | 8/2019 | Ho | B64C 39/024 |

* cited by examiner

OBSCURATION MAP GENERATION

STATEMENT OF GOVERNMENTAL INTEREST

This invention was made with U.S. Government support under contract no. N00019-15-G-0026 DO 0503 awarded by the U.S. Government. The U.S. Government has certain rights in the invention.

TECHNICAL FIELD

The present disclosure relates to the generation of obscuration maps for transmitter and receiver systems.

BACKGROUND

An obscuration refers to a feature within a field of view or regard of a transmitter or receiver. When such transmitters or receivers are installed on aircraft, example obscurations include the fuselage, tails or wings of the host aircraft which prevent the transmitter from seeing an incoming threat. Obscuration maps are included as part of, for example, an Aircraft Characterization Module image. Such images are utilized by the control systems of the aircraft in order to reduce false alarms, to allow the aircraft to properly allocate transmitters, and increasing the operational life of the transmitter and receiver systems.

The current processes to create transmitter and receiver obscuration maps utilize marking tangential points created by a laser mounted at the transmitter or receiver's location on the aircraft. These processes are time-consuming and labor intensive.

Obscuration maps are particularly useful in Directional Infrared Countermeasure systems which utilize sensors to detect incoming threats and transmitters to direct infrared energy at the detected threats to neutralize the threats. Obscuration maps are used by the receiver to determine the receiver's field of regard. Obscuration maps are also used by the transmitters to ensure that the transmitters do not projected infrared energy at the aircraft or other platform to which the transmitter is mounted.

DESCRIPTION OF EXAMPLE EMBODIMENTS

Overview

According to a first example embodiment, a camera is arranged on a transmitter or receiver mount configured to provide a transmitter or receiver with a field of regard. Image data of the field of regard is captured by the camera. A location of an obscuration within the field of regard from the image data is determined from the image data. A map of obscurations within the field of regard is generated based upon the image data and the location of the obscuration within the field of regard. According to more specific example embodiments, the transmitter or receiver is a directional infrared countermeasure transmitter or receiver.

According to a second example embodiment, an apparatus is provided that includes a mounting plate of a camera positioning fixture; an azimuthal angle positioning plate rotatably mounted to the mounting plate; a mounting arm mounted to the azimuthal angle positioning plate and extending in a direction normal to a surface of the azimuthal angle positioning plate; a polar positioning mount rotatably mounted to the mounting arm; and a camera mount connected to the polar positioning mount and configured to secure the camera to the fixture. The mounting plate is configured to secure the camera positioning fixture to a transmitter or receiver mount; and the mounting arm, the azimuthal angle positioning plate and the polar positioning mount are configured to position the camera at a plurality of positions for acquisition of image data by the camera corresponding to a field of regard of the transmitter or a field of regard of the receiver.

According to a third example embodiment, an apparatus is provided that includes a communication interface; and a processor. The processor is configured to receive, via the communication interface; image data corresponding to a field of regard of a transmitter or receiver; determine pixel coordinates of an obscuration in the field of regard of the transmitter or receiver contained in the image data; determine a location of the obscuration relative to the transmitter or receiver by translating the pixel coordinates to coordinates relative to a location of the transmitter or receiver; and generate an obscuration map from the coordinates relative to the location of the transmitter or receiver.

EXAMPLE EMBODIMENTS

Figure 1:
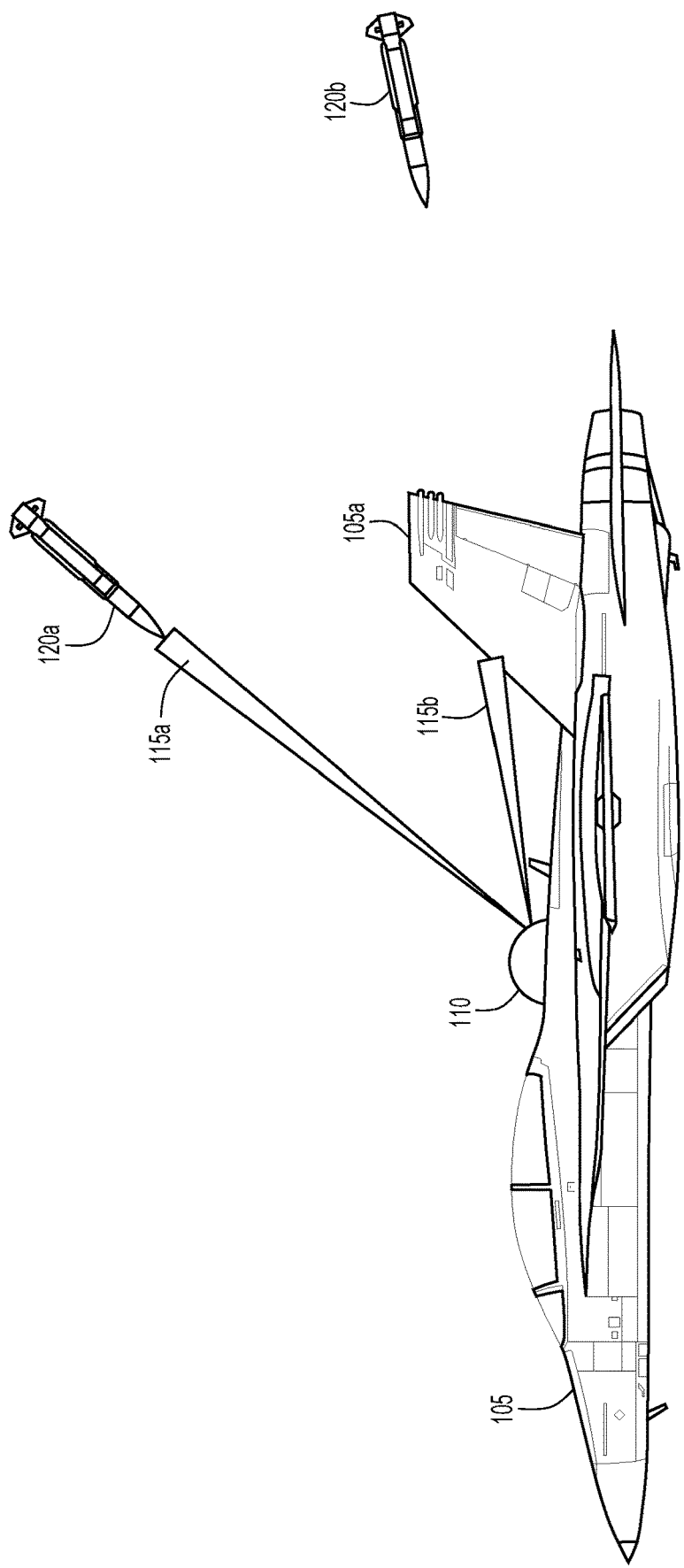
FIG. 1 is an illustration of a Directional Infrared Countermeasure transmitter field of regard, according to an example embodiment.

With reference made to FIG. 1, depicted therein is a platform 105 to which a directional transmitter 110 is attached. In this case, platform 105 is an aircraft, and transmitter 110 is the infrared source for a directional infrared countermeasure (DIRCM) system. While FIG. 1 illustrates an aircraft and a transmitter mounted thereto, the techniques of the present disclosure are not so limited. Instead, the techniques described herein may be applied to any transmitter or receiver device with a field of view or field of regard (FOR) in which obscurations may be arranged. The application of the disclosed techniques to DIRCM systems is just one example embodiment thereof.

Figure 2:
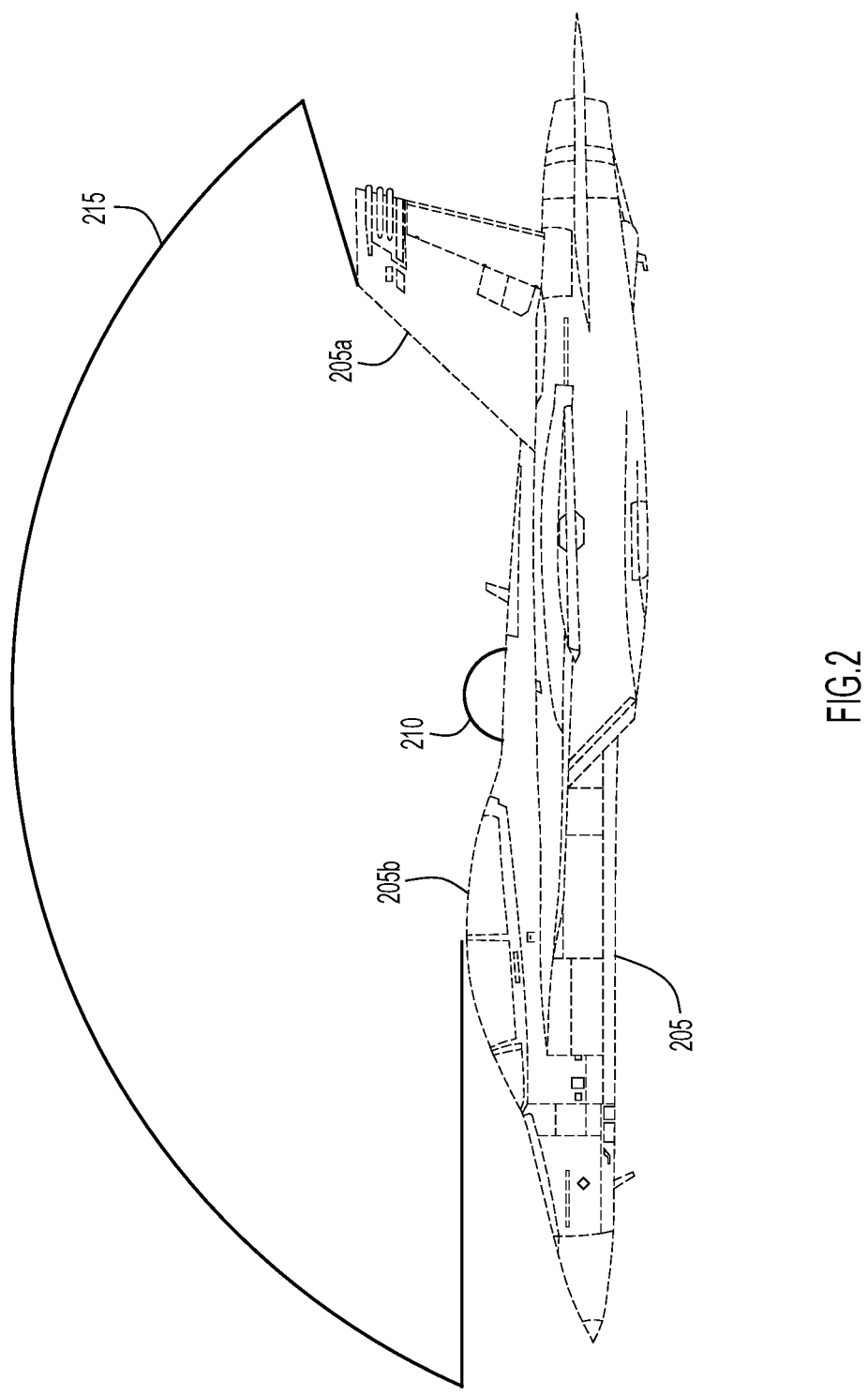
FIG. 2 is an illustration of a Directional Infrared Countermeasure receiver field of regard, according to an example embodiment.

Transmitter 110, according to the present example embodiment, directs infrared beams 115a and 115b towards detected threats 120a and 120b. As illustrated, infrared beam 115a is able to contact or "lase" threat 120a, while infrared beam 115b is prevented or obscured from lasing threat 120b due to the location of tailfin 105a of aircraft 105. In other words, tailfin 105a is an obscuration within the field of view or FOR of transmitter 110. An obscuration refers to a feature within the field of regard of a transmitter, such as the fuselage, tail or wing of an aircraft serving as the platform for the transmitter that prevents the transmitter from "seeing" or engaging an incoming threat. Features which do not change position in the transmitter FOR are defined as hard obscurations while features with moving parts (e.g. landing gear, flaps, fins, etc.) or that may flex (e.g. wings) may be considered temporary obscurations and may be referred to as soft obscurations. Similarly, as illustrated in FIG. 2, a sensor or receiver 210 may have an FOR 215 which is limited by obscurations 205a and 205b, in this case a tailfin and canopy, respectively, of aircraft 205 which serves as the platform for sensor/receiver 210. As with FIG. 1, the techniques of the present disclosure are not limited to receivers mounted to aircraft, or receivers used to implement DIRCM systems. For example, the techniques of the present disclosure may be used to locate obscurations in FORs for any sensor, wide-angle camera, narrow-angle camera, lens, imaging device, or other type of receiver configured to acquire date within an FOR. Accordingly, "receiver" as used herein is broadly construed to encompass such sensor, imaging, and other receiver devices that sense or receive throughout an FOR.

In order to compensate for these obscurations within FORs of transmitters and sensors/receivers, maps of these obscurations, or obscuration maps may be used. Obscuration maps are used to properly allocate transmitters and sensor/receivers to ensure a full FOR, reduce false alarms, and ensure that transmitters, such as transmitter 110 of FIG. 1, do not lase portions of their platform, such as tail fine 105a of FIG. 1.

One technique for creating obscuration maps may involve marking tangential points created by a laser mounted at the transmitter or sensor/receiver location. The use of such laser detection is both time-consuming and labor intensive. Specifically, a Laser Pointer Tool (LPT), mounts a laser pointer in the exact location of the transmitter or sensor/receiver. The LPT is used to mark hundreds of physical spots (tangent points) utilizing masking tape and a marker pen. A laser tracker and other metrology equipment is then used to measure and map out the points relative to the transmitter location. Depending on the number of transmitters and their installed locations, this technique may take hundreds of hours to perform (e.g., roughly 240 labor hours of field effort with up to five days of exclusive access on the aircraft, followed by roughly 120 hours of post-processing). Obviously, such techniques are labor intensive and contain sources of variation such as tangent point identification and corner cube placements, as well as data processing.

The techniques of the present disclosure utilize one or more cameras, which may be off-the-shelf (OTS) cameras such as GoPro® cameras, arranged at the transmitter or sensor location. A novel fixture may be utilized to position the camera or cameras in desired locations. The techniques to be described herein include taking photographs of the obscuration field over the entire FOR of the transmitter or sensor/receiver. The photographs may then be uploaded to a computer system implementing a post-processing software tool that is utilized to trace the obscuration edges. The techniques of the present disclosure may require significantly less effort in the field (e.g., about 48 labor hours and only two days on the aircraft) and an equivalent post-processing time of roughly 120 hours.

Figure 3:
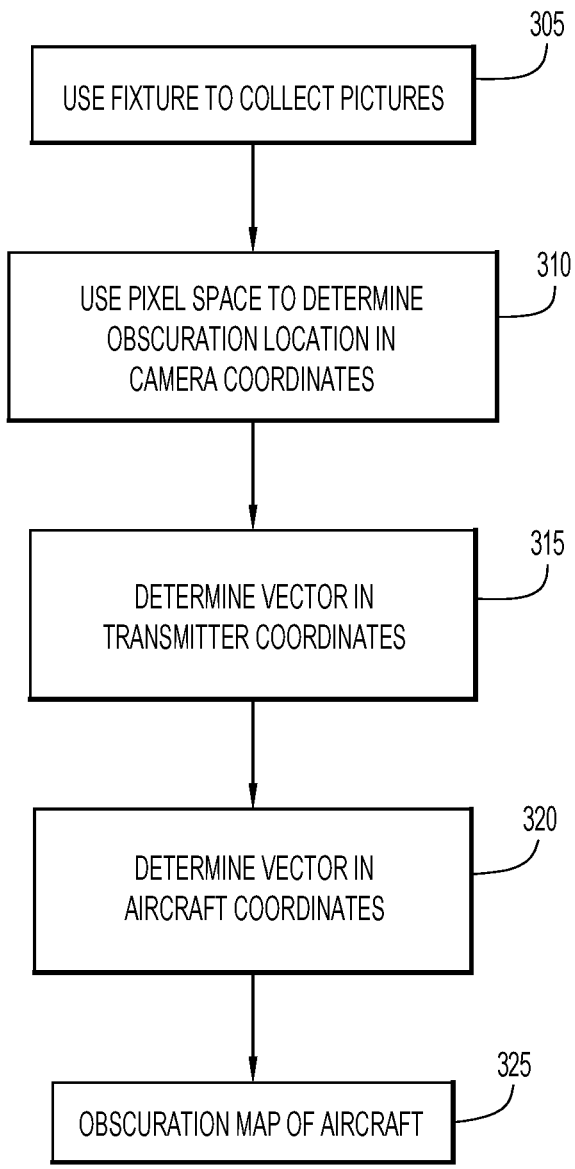
FIG. 3 is a flowchart illustrating a first process for generating an obscuration map, according to an example embodiment.

With reference now made to FIG. 3, depicted therein is an example process 300 for generating an obscuration map for a transmitter according to the techniques described herein. The process begins in operation 305 in which a fixture arranged at the transmitter mount of, for example, a DIRCM system is used in conjunction with a camera to collect image data of the FOR of the transmitter. An example of such a fixture will be described in more detail with reference to FIG. 5, below. Though, as noted above, other example embodiments may arrange the fixture at a mount for any transmitter, receiver or sensor configured to transmit over or image with an FOR. The image data acquired may be acquired by altering the orientation of the camera within the transmitter mount via the fixture to acquire image data for the entire FOR of the transmitter. According to such an embodiment, the fixture may be configured to position a camera in a plurality of orientations that will result in the camera acquiring image data for the entire FOR of the transmitter. According to some example embodiments, the image data may comprise a series of discrete digital photographs. According to other example embodiments, the fixture may be configured to continuously move the camera through different orientations to generate a single photograph or image of the FOR.

Figure 4:
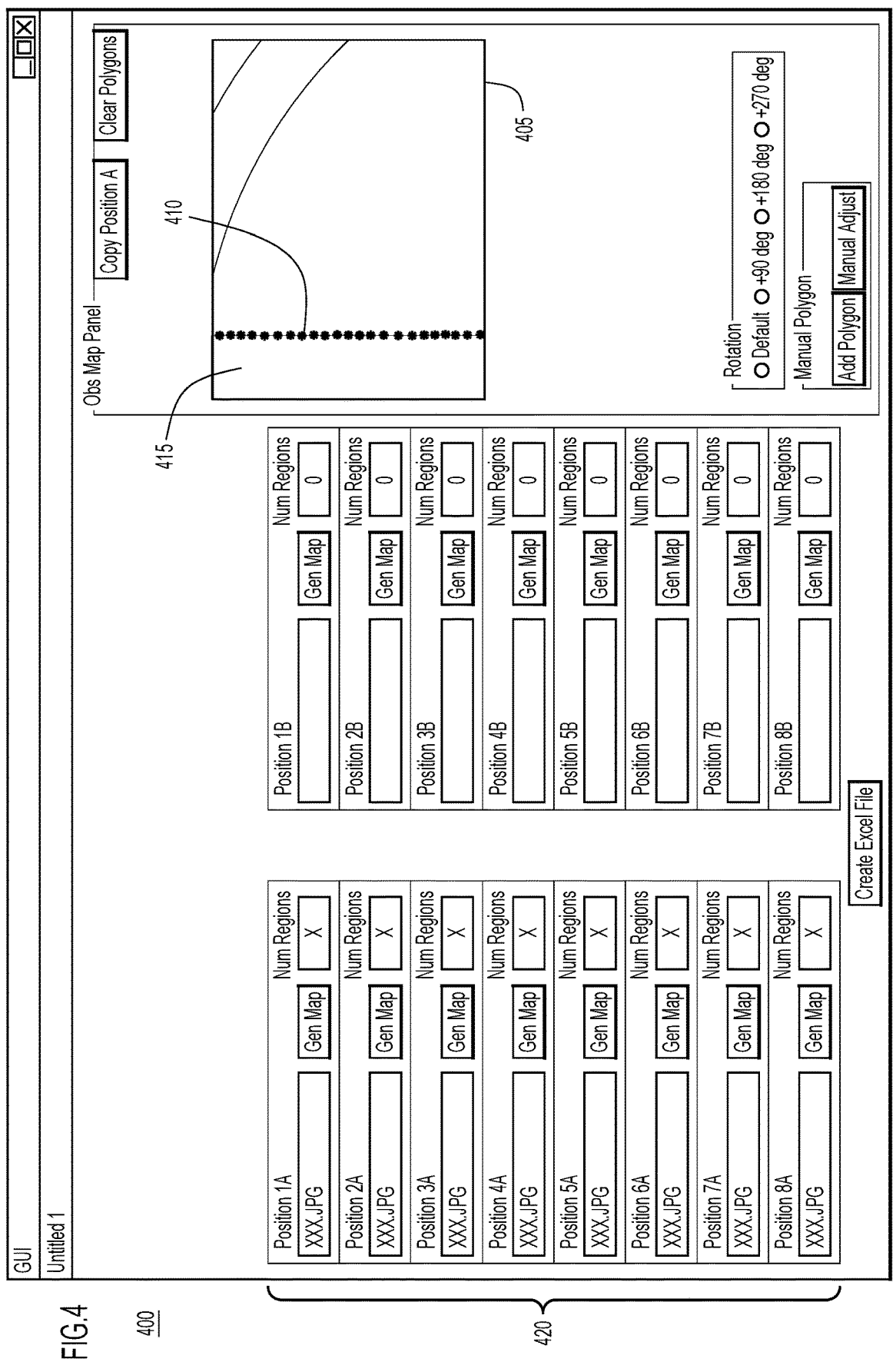
FIG. 4 is a screen shot of a computer implemented tool that may be used for generating an obscuration map, according to an example embodiment.

In operation 310, an obscuration in the image data is determined. For example, as illustrated in FIG. 4, the image data date acquired in operation 305 may be uploaded to a software tool and presented to a user who outlines the location of obscuration within the image. Specifically, as illustrated in FIG. 4, user interface 400 of such a software tool provides an image portion 405 that displays image data of the FOR of a transmitter to a user. Image portion 405 includes an outline 410 of an obscuration 415 within image portion 405. The outline 405 of obscuration 415 may be automatically generated utilizing techniques such as edge recognition within image portion 405. According to other embodiments, a user may define outline 410 within image portion 405. The user may also be able to indicate additional pixels that will correspond to a temporary or soft obscuration, and mark these separately for inclusion in the obscuration map as a soft obscuration. More specifically, a user may provide outline 410, which outlines hard obscurations, and separately provide a separate outline indicating the extent of the soft obscuration. According to other example embodiments, two images may be taken at the same fixture orientation, but with the soft obscuration positioned differently. For example, a first image may be taken with a wing or fin positioned in one orientation, and a second image may be taken with a wing or fin in a second orientation. The obscurations indicated in these two images may be used to determine the locations for the soft obscurations. According to still other example embodiments, the user may be able to indicate when an obscuration is associated with an element that flexes, and such locations may be "padded" to ensure that the flexing of the element is taken into account in the obscuration map.

Without outline 410 determined, the pixels within the outline are determined to be an obscuration within the image 405. These pixels are given a coordinate within the image, or given a coordinate within the "pixel space" defined by the image. Using image selection portion 420, the user may be able to select different image data sets that, when combined, comprise the entire FOR of the transmitter.

Returning to FIG. 3, in operation 315, the obscurations determined in the pixel space are then determined as a vector in a reference frame relative to the fixture to which the camera is attached to acquire the pictures as described above with reference to operation 305. Specifically, because the fixture is arranged at the transmitter location (an example of such a fixture is described in detail below with reference to FIG. 5), the fixture may be used to determine the position or orientation of the camera used to acquire the image, as well as specific pixels within each image. This camera arrangement may be used to determine a corresponding positioning or orientation of the transmitter that would result in the transmitter being directed towards the obscurations. This positioning or orienting may be described using a vector of values relative to the transmitter location. For example, a location within outline 410 of FIG. 4, corresponding to a portion of an obscuration, may be given a vector value corresponding to a position or orientation of the transmitter that would be directed towards that obscuration. Such a vector may correspond to a polar angle and an azimuthal angle of the transmitter that would direct the transmitter towards the obscuration. Furthermore, as will be described in greater detail below with reference to FIG. 5, the image data may be acquired by rotating a camera through an azimuthal angle and a polar angle. The rotation of the camera through these azimuthal and polar angles may be examples of the positions or orientations described above. The image acquisition optics of the camera may be slightly off center at each angular position. Accordingly, operation 315 may translate the vectors acquired in operation 310 such that obscurations determined from image data acquired at different orientations are all indicated using vectors from a common reference point on or relative to the fixture or transmitter when installed on the platform.

In operation 320, the vector describing the location of the obscuration in coordinates relative to the transmitter is determined as a vector in coordinates relative to the aircraft, or other platform upon which the transmitter is arranged. According to some example embodiments, the vector in transmitter coordinates and the vector in aircraft coordinates may be the same value, such as when the techniques described herein are applied to an aircraft with a single transmitter. According to other example embodiments, such as embodiments in which the techniques described herein are applied to an aircraft with multiple transmitters, the aircraft coordinates may be a coordinate system centered at a location different from that of the location of one or more of the transmitters. Accordingly, operation 320 translates the vector in transmitter coordinates to a vector in aircraft coordinates.

Finally, in operation 325, obscurations located and mapped to aircraft coordinates are combined into an obscuration map for the aircraft. The obscuration map may then be stored in a memory of a processing system of the aircraft and used in the operation of the DIRCM system. Once stored in the memory, the obscuration map may be utilized by the processing system of the aircraft to reduce false alarms, to allow the aircraft to properly allocate transmitters, and to increase the operational life of the transmitter and received systems.

Figure 5:
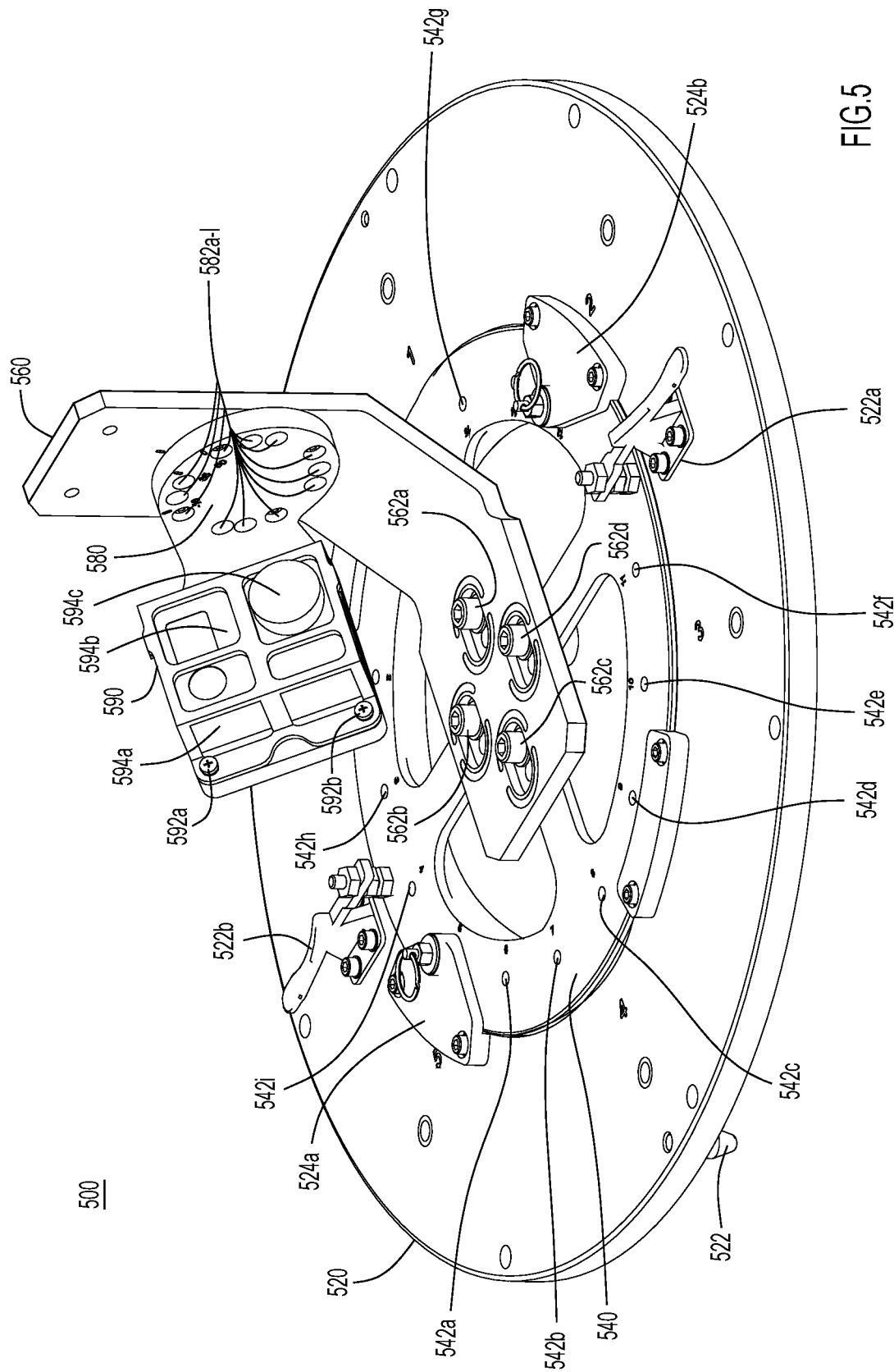
FIG. 5 is a perspective view of a first camera mounting fixture used for generating an obscuration map, according to an example embodiment.

With reference now made to FIG. 5, depicted therein is an example fixture 500 that is configured for use with the techniques described herein. Fixture 500 includes five main parts: mounting plate 520, azimuthal positioning plate 540, mounting arm 560, polar positioning mount 580, and camera mount 590.

As illustrated in FIG. 5, mounting plate 520 is configured to arrange fixture 500 within the transmitter mounting structure (not shown) of a platform to which a DIRCM system is mounted. If the transmitter mounting system includes a lens or dome assembly, the fixture 500 may be used with the lens or dome assembly in place. According to other example embodiments, the lens or dome assembly of the transmitter mounding structure may be removed during use of the fixture 500. Furthermore, while fixture 500 is configured to be arranged within the transmitter mounting structure in place of the transmitter, other example embodiments may position the fixture 500 in the transmitter mounting structure with the transmitter still in place.

According to the example of FIG. 5, mounting plate 520 includes one more mounting pins 522 which allow fixture 500 to be positioned and secured within the transmitter mounting structure of the DIRCM platform. According to other example embodiments, mounting plate 520 may be configured with holes to receive, for example, pins or screws incorporated into the transmitter mounting structure. Similarly, other example embodiments of mounting plate 520 may be configured with holes or threaded holes through which screws or bolts may be used to secure mounting plate 520 to corresponding threaded holes in the transmitter mounting structure.

Arranged within mounting plate 520 is azimuthal positioning plate 540. Azimuthal position plate 540 is rotatably mounted to mounting plate 520 so that the fixture may be used to image obscurations at a plurality of different azimuthal angles. For example, a bearing (not pictured) may be press-fit into mounting plate 520, and azimuthal positioning plate 540 may be mounted to the bearing so that it may easily rotate relative to mounting plate 520. Once appropriately positioned relative to mounting plate 520, azimuthal positioning plate 540 may be secured to mounting plate 520 via clamps 522a and 522b, as well as alignment notches 524a and 524b and registration holes 542a-i. Specifically, one or more of registration holes 542a-i is aligned with one or more of alignment notches 524a and 524b. Clamps 522a and 522b may be used to secure azimuthal position plate 540 at this position while a camera mounted in camera mount 590 is used to image obscurations at one or more polar angles. After imaging obscurations at this first azimuthal angle, clamps 522a and 522b may be loosened, azimuthal position plate 540 may be rotated so that different registrations holes 542a-i align with alignment notches 524a and 524b, clamps 522a and 522b may be retightened, and imaging of obscurations may take place at this new azimuthal angle. This process may repeat for a desired number of azimuthal angles.

Also included in fixture 500 is mounting arm 560 via which the camera is mounted to azimuthal positioning plate 540. According to example embodiments, mounting arm 560 serves to attach the camera to the azimuthal positioning place 540 and also raise the camera to a position above mounting plate 520 that corresponds to a height of a DIRCM transmitter when it is positioned within the transmitter mounting structure. As illustrated in FIG. 5, mounting arm 560 is secured to azimuthal positioning plate 540 via bolts 562a-d, though other structures known to those skilled in the art may also be used. Mounting arm 560 may also be integrally formed with azimuthal positioning place 540.

Attached to mounting arm 560 is polar positioning mount 580. Polar positioning mount 580 is configured to position the camera such that the camera may be directed at a plurality of polar angles. For example, at each azimuthal position of the camera, the camera may also be positioned to image at a plurality of polar angles, thereby allowing the camera to image the entire field of regard of the transmitter. In order to position the camera at the plurality of polar angles, polar positioning mount 580 is configured with a series of holes 582*a-l*. Corresponding holes are included in mounting arm 560. By arranging screws, bolts, pins or other means of securing polar positioning mount 580 to mounting arm 560, the camera may be positioned at one or more pre-determined polar orientations. By combining a number of azimuthal positions via azimuthal positioning plate 540 with a number of polar positions via polar positioning mount 580, the camera may be oriented to image the entire FOR of the transmitter. According to some example embodiments, the range of motion permitted by azimuthal position plate 540 and polar positioning mount 580 may be configured to match the range of motion of the transmitter. According to other example embodiments, the range of motion permitted by azimuthal position plate 540 and polar positioning mount 580 may be configured to provide a range of motion that is greater than that provided by the transmitter.

Finally, included in fixture 500 is camera holder 590. The example embodiment of FIG. 5 illustrates camera holder 590 as having a clam-shell design in which a camera is enclosed on either side by portions of camera holder 590, and screws or bolts 592*a* and 592*b* secure the camera within the clam shell portions of camera holder 590. Also include in cameral holder 590 are a series of orifices 594*a-c* which permit access to the manual controls, optical elements, and electrical elements of the camera.

Fixture 500 of FIG. 5 is configured to be manually oriented through a series of azimuthal and polar positions, elements 522*a-b*, 524*a-b*, 542*a*-1, and 582*a*-1 allowing a user to position and secure fixture 500 at the orientations needed to image the entire FOR of the transmitter. The camera may be controlled to image at each of these orientations either remotely or via access to the camera via orifices 594*a-c*. As understood by the skilled artisan, one or more of elements 522*a-b*, 524*a-b*, 542*a*-1, and 582*a*-1 may be replaced or supplemented with one or more actuators. These actuators, along with the camera, may be computer controlled to automate the process of imaging the FOR of the transmitter. In such example embodiments, the camera may be continuously moved through a plurality of azimuthal and polar angles to generate a panoramic view of the FOR of the transmitter.

Figure 6:
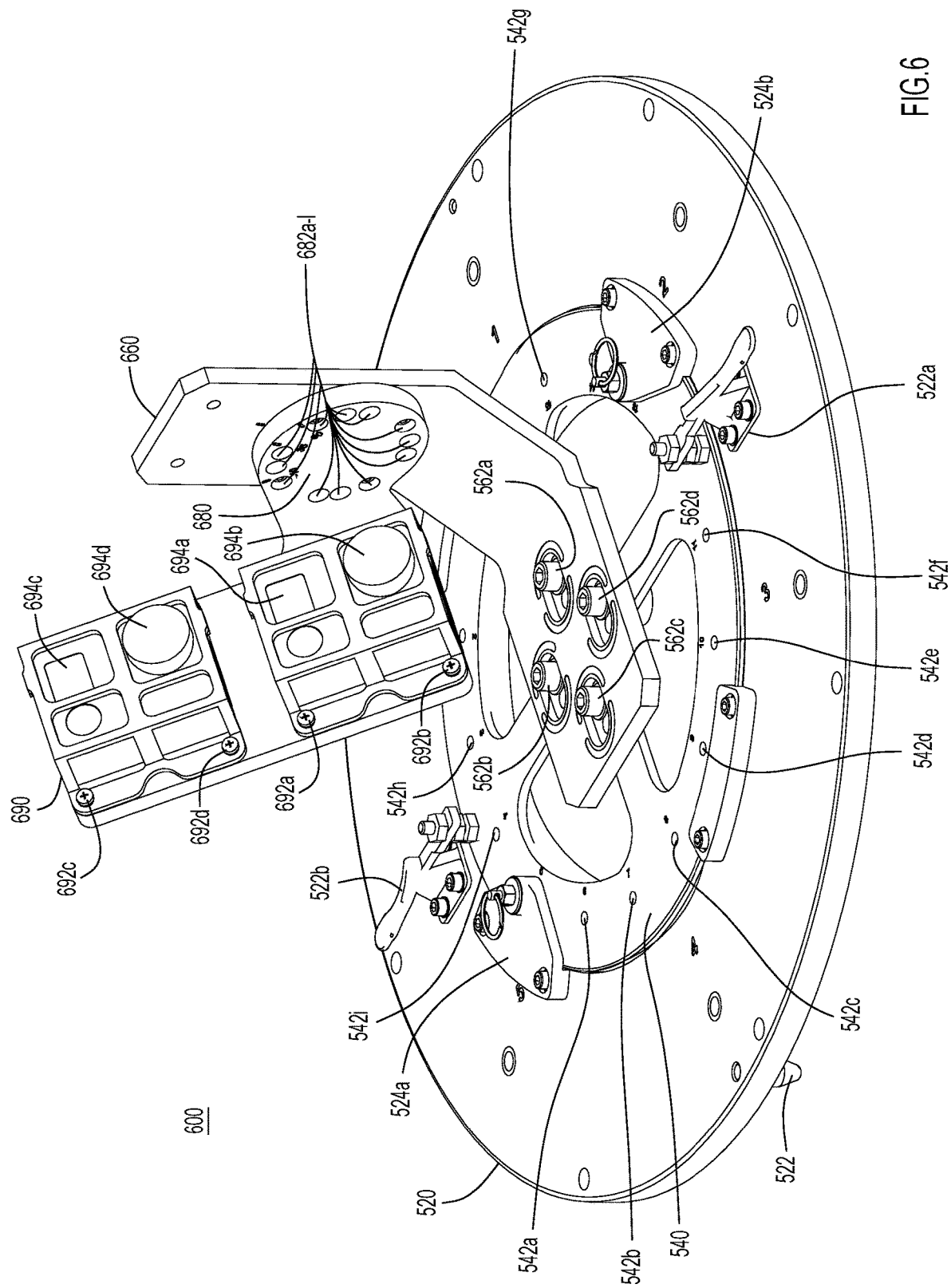
FIG. 6 is a perspective view of a second camera mounting fixture used for generating an obscuration map, according to an example embodiment.

With reference now made to FIG. 6, depicted therein is an alternative fixture 600 used according to the techniques described herein. In general, fixture 600 is constructed and operates in a manner similar to that of fixture 500 of FIG. 5, and therefore, like reference numerals have been used to refer to like elements. Fixture 600 differs from that of fixture 500 of FIG. 5 in that camera holder 690 is configured to hold two cameras instead of the one camera of camera holder 590 of FIG. 5. As will be described in greater detail below with reference to FIG. 8, by using two cameras, three dimensional information including the distance from the transmitter to the imaged obscurations may be derived from the image data acquired by the cameras. This results in some structural differences between mounting arm 660, polar positioning mount 680 and camera holder 690 and the corresponding structures, polar positioning mount 580, mounting arm 560 and camera holder 590 of FIG. 5.

First, in order to accommodate a second camera, camera holder 690 includes two clam shell enclosures, secured with bolts 692*a-b* and 692*c-d*, respectfully, and containing two sets of orifices 694*a-b* and 694*c-d*, respectively.

Figure 7:
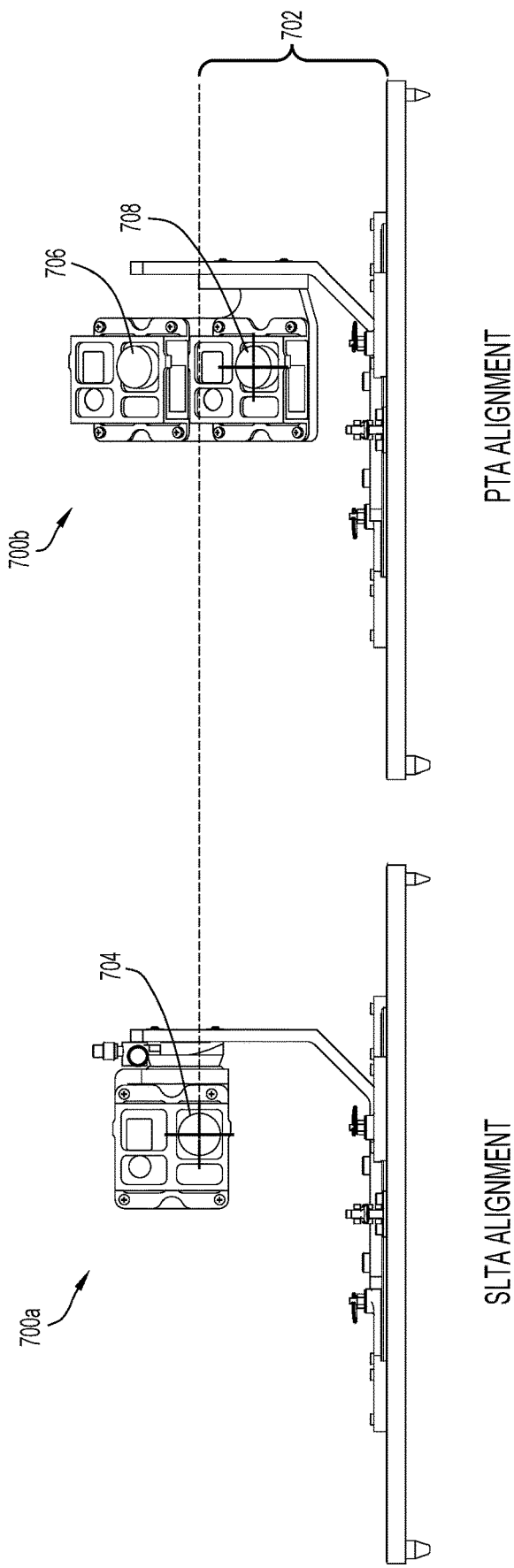
FIG. 7 are front views of the first and second camera mounting fixtures, respectively, according to an example embodiment.

Second, polar positioning mount 580 of FIG. 5 is positioned on mounting arm 560 such that the optical sensor of the camera is positioned where the output of the DIRCM transmitter would be positioned. On the other hand, polar positioning mount 680 is positioned on mounting arm 660 such that the midpoint between the optical sensors of the two cameras is positioned where the output of the DIRCM transmitter would be positioned. An example of these differences in arrangement is illustrated in FIG. 7. As shown in FIG. 7, transmitter height 702 aligns with the optical element of 704 of single camera fixture 700*a*, while transmitter height 702 aligns with the midpoint between optical elements 706 and 708 of fixture 700*b*.

Figure 8:
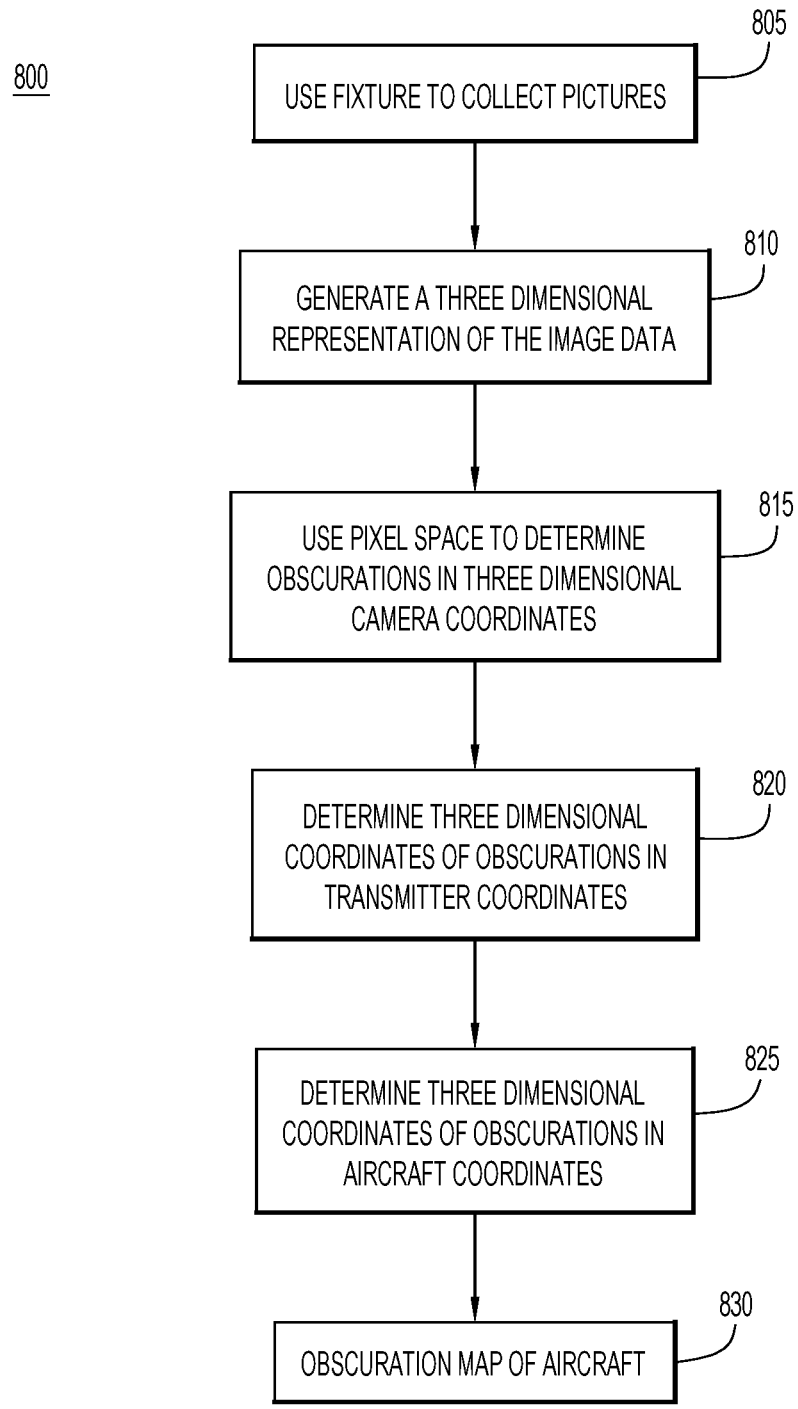
FIG. 8 is a flow chart illustrating a method that may be used for generating an obscuration map, according to an example embodiment.

With reference now made to FIG. 8, depicted therein is a process for generating an obscuration map using a fixture like fixture 600 of FIG. 6. Specifically, depicted in FIG. 8 is an example process 800 for generating an obscuration map according to the techniques described herein that utilizes stereoscopic cameras to generate the obscuration map.

The process begins in operation 805 in which a fixture arranged at the transmitter mount of, for example, a DIRCM system is used in conjunction with a plurality of cameras to collect image data of the FOR of the transmitter. Though, as noted above, other example embodiments may arrange the fixture at a mount for any transmitter, receiver or sensor configured to transmit over or image with an FOR. More specifically the fixture is configured to position two camera, such as fixture 600 of FIG. 6. Other example embodiments may utilize fixtures with more than two cameras. The image data acquired may be acquired from each of the two cameras from a plurality of positions so that the image data includes image data for the entire FOR of the transmitter. More specifically, pairs of images are acquired for each position such that each camera acquires image data for each position, but the image data acquired by the two cameras is slightly offset from each other. As with the process of the example embodiment of FIG. 3, the image data acquired by the pair of cameras may comprise a series of discrete digital photographs. More specifically, the image data may comprises a series of pairs of images acquired by each of the two cameras. According to other example embodiments, the fixture may be configured to move the two cameras through a continuous path to generate a pair of photographs or images of the entire FOR.

In operation 810, a three dimensional representation of the image data is generated. Because two pairs of images have been generated by the pairs of cameras, it is possible to generate three dimensional image data from pairs of two-dimensional image data. For example, stereo triangulation may be used to determine depth data of the pixels of image data acquired using the pairs of (i.e., stereoscopic) cameras. Specifically, the depth to points in the image data, for example from the center point of the line between the focal points of the two cameras, may be determined. In order to determine these depth measurements, corresponding points in the pairs of image data are determined. Finding the corresponding portions of the shared images may be done manually, with a user selecting corresponding pixels in the two images, or image processing may be utilized to automate this process.

In order to determine the depth information, example embodiments of operation 810 may first rectify the pairs of image data. Rectification is a transformation process used to project the pairs of image data onto a common image plane. For example, X and Y rotations may be used to put the images on the same plane, scaling may be used to make the pairs of image data the same size, and Z rotation and skew adjustments may make pixel rows of the image data directly line up. Calibrated and un-calibrated rectification processes may be utilized. Un-calibrated stereo image rectification is achieved by determining a set of matched interest points, estimating the fundamental matrix for the two cameras, and then deriving two projective transformations. The fundamental matrix is a relationship between any two images of the same scene that constrains where the projection of points from the scene can occur in both images. Calibrated stereo rectification uses information from a stereo camera calibration process. Stereo camera calibration is used to determine the intrinsic parameters and relative location of cameras in a stereo pair, and this information is then used for stereo rectification and 3-D reconstruction. Such a calibration process may include taking images of a known pattern (such as a checkerboard pattern) at a known depth. Stereoscopic images of this known pattern at the known depth may be used to determine the intrinsic parameters and relative location of cameras, which may then be used to rectify the obscuration image data pairs to generate the three-dimensional representation of the image data.

Once three-dimensional representations of the image data are generated, an obscuration in the image data is determined in operation 815. For example, the obscurations may be outlined by a user in a system like that illustrated and as described above with reference to FIG. 4. Because the pairs of image data have been processed in operation 810, the user interface of FIG. 4 need only display the image data from one of the two cameras. According to other example embodiments, the user may be asked to indicate and/or outline the obscurations in each pair of image data. Once the obscuration is indicated, a three-dimensional coordinate or coordinates may be determined for the obscuration. Depending on how the three-dimensional representation is generated in operation 810, the three-dimensional coordinate or coordinates of the obscuration may take on different forms. For example, the coordinate or coordinates may be spherical coordinate values that include an azimuthal orientation of the center point between the pairs of cameras, a polar orientation of the center point between the pairs of cameras and a radial depth to the obscuration from the center point between the pairs of cameras. According to other example embodiments, the coordinate or coordinates may be three-dimensional Cartesian coordinates with an origin at the center point between the pairs of cameras.

In operation 820, the obscurations locations are determined as three-dimensional coordinates in a reference frame relative to the fixture to which the camera is attached to acquire the pictures as described above with reference to operation 805. Specifically, due to the rotation of, for example, polar positioning mount 680 of FIG. 6, the three dimensional coordinates determined in operation 815 may be slightly different at different polar orientations. Similarly, due to the rotation of azimuthal positioning plate 540 of FIG. 6, the three dimensional coordinates determined in operation 815 may be slightly be different at different azimuthal orientations. Accordingly, in operation 820, the three dimensional coordinates acquired in operation 815 may be mapped to coordinates from a fixed location on or relative to the fixture or the location of the transmitter when installed in the platform.

In operation 825, the coordinates describing the location of the obscuration in coordinates relative to the transmitter are determined in coordinates relative to the aircraft, or other platform upon which the transmitter is arranged. According to some example embodiments, the coordinates in transmitter coordinates and the coordinates in aircraft coordinates may be the same value, such as when the techniques described herein are applied to an aircraft with a single transmitter. According to other example embodiments, such as embodiments in which the techniques described herein are applied to an aircraft with multiple transmitters, the aircraft coordinates may be a coordinate system centered at a location different from that of the location of one or more of the transmitters. Accordingly, operation 825 translates the coordinates in transmitter coordinates to coordinates in aircraft coordinates.

Finally, in operation 830, obscurations located and mapped to aircraft coordinates are combined into an obscuration map for the aircraft.

Through the use of processes like those of the example embodiments of FIGS. 3 and 8, utilizing fixtures like those illustrated in FIGS. 5-7 and/or utilizing tools like the one illustrated in FIG. 4, obscuration maps may be generated in ways that provide substantial benefits over related art techniques. Depending on the number of transmitters and their installed locations, the techniques of the present disclosure may require significantly less effort in the field. For example, the techniques of the present disclosure may result in a greater than 50% reduction in man hours in the field. Furthermore, the equipment necessary to perform the techniques described herein may provide significant cost savings over those of related art techniques. As described above, the techniques of the present disclosure utilize one or more cameras, which may be OTS cameras such as GoPro® cameras. Such OTS cameras are significantly less expensive than the laser range finders utilized in related art techniques. Additionally, even though the OTS cameras used in the present techniques may suffer from variations, such as variations introduced via image magnification, ambient lighting, glare, edge definition/camera resolution, and data processing, the obscuration maps generated from the present techniques are shown to be of comparable accuracy to those generated by more cost and time intensive systems.

Figure 9:
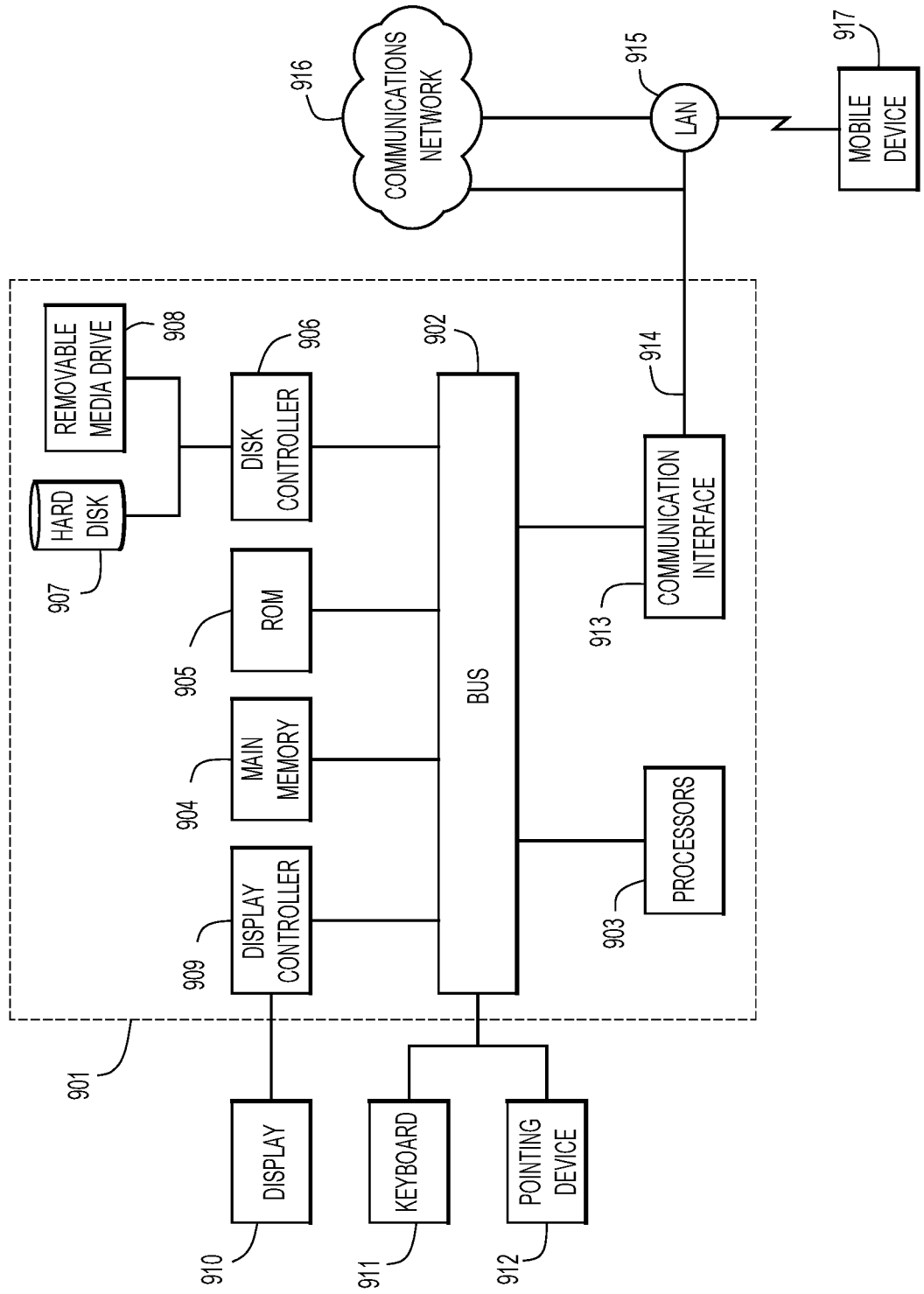
FIG. 9 is a schematic diagram showing a computing system configured to implement the techniques described herein, according to an example embodiment.

Finally, illustrated in FIG. 9 is a computer system configured to implement the techniques described herein. The computer system 901 may be programmed to implement a computer based device, such as a device configured to implement at tool like that illustrated in FIG. 4, or a tool used to perform processing corresponding to the operations of FIGS. 3 and 8. The computer system 901 includes a bus 902 or other communication mechanism for communicating information, and a processor 903 coupled with the bus 902 for processing the information. While the figure shows a single block 903 for a processor, it should be understood that the processors 903 represent a plurality of processing cores, each of which can perform separate processing. The computer system 901 also includes a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903.

The computer system 901 further includes a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 also includes a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a cathode ray tube (CRT), Liquid Crystal Display (LCD) or other now known or hereinafter developed display technologies, for displaying information to a computer user. The computer system 901 includes input devices, such as a keyboard 911 and a pointing device 912, for interacting with a computer user and providing information to the processor 903. The pointing device 912, for example, may be a mouse, a trackball, or a pointing stick for communicating direction information and command selections to the processor 903 and for controlling cursor movement on the display 910. Input devices 911 and 912 may be used by a user to identify obscurations as described above with reference to FIG. 4. For example, pointing device 911 may be used to define outline 410. Pointing device 911 may also be used within selection portion 420 of FIG. 4 to select different image data sets that, when combined, comprise the entire FOR of the transmitter. Similarly, display 910 may be used to display user interface 400 of FIG. 4. In addition, a printer may provide printed listings of data stored and/or generated by the computer system 901.

The computer system 901 performs a portion or all of the processing steps of the process in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the process, and for enabling the computer system 901 to interact with a human user. Such software may include, but is not limited to, device drivers, operating systems, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 913 coupled to the bus 902. The communication interface 913 provides a two-way data communication coupling to a network link 914 that is connected to, for example, a local area network (LAN) 915, or to another communications network 916 such as the Internet. For example, the communication interface 913 may be a wired or wireless network interface card to attach to any packet switched (wired or wireless) LAN. As another example, the communication interface 913 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 913 sends and receives electrical, electromagnetic or optical signals that carry digital data streams representing various types of information.

The network link 914 typically provides data communication through one or more networks to other data devices. For example, the network link 914 may provide a connection to another computer through a local are network 915 (e.g., a LAN) or through equipment operated by a service provider, which provides communication services through a communications network 916. The local network 914 and the communications network 916 use, for example, electrical, electromagnetic, or optical signals that carry digital data streams, and the associated physical layer (e.g., CAT 5 cable, coaxial cable, optical fiber, etc.). The signals through the various networks and the signals on the network link 914 and through the communication interface 913, which carry the digital data to and from the computer system 901 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 915 and 916, the network link 914 and the communication interface 913. Moreover, the network link 914 may provide a connection through a LAN 915 to a mobile device 917 such as a personal digital assistant (PDA) laptop computer, or cellular telephone.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   arranging a camera on a transmitter or receiver mount of a vehicle, wherein the transmitter or receiver mount is configured to provide a transmitter or receiver with a field of regard;
   capturing, via the camera, image data of the field of regard;
   determining a location of an obscuration caused by a portion of the vehicle within the field of regard from the image data; and
   generating an obscuration map of obscurations within the field of regard based upon the location of the obscuration within the field of regard;
   storing the obscuration map in a memory of a processing system of the vehicle; and
   utilizing the obscuration map, via the processing system of the vehicle, to reduce false alarms, properly allocate transmitters or increase an operation life of the transmitter or receiver, wherein determining the location of the obscuration comprises:
      generating an image from the image data;
      presenting the image to a user via a user display device;
      receiving a user input comprising an indication of the location of the obscuration in a pixel space of the image;
      determining the location of the obscuration in coordinates relative to the camera of the location of the obscuration in the pixel space of the image;
      determining a vector of the location of the obscuration in coordinates relative to the transmitter or the receiver; and
      determining a vector of the location of the obscuration in coordinates relative to the vehicle.

2. The method of claim 1, wherein transmitter or receiver comprises a directional infrared countermeasure transmitter or receiver.

3. The method of claim 1, wherein determining the location of an obscuration within the field of regard comprises determining an angular location of the obscuration relative to the camera and a distance from the camera.

4. The method of claim 1, wherein arranging the camera comprises arranging a plurality of cameras on the transmitter or receiver mount; and
   wherein capturing image data of the field of regard comprises:
      capturing image data from each of the plurality of cameras, and
      generating three-dimensional data from the image data from each of the plurality of cameras; and
   wherein determining the location of the obscuration comprises determining a three-dimensional location of the obscuration from the three-dimensional data.

5. The method of claim 1, wherein capturing image data of the field of regard comprises capturing a plurality of photographs.

6. The method of claim 1, wherein determining the location of the obscuration comprises determining a location of a permanent obscuration.

7. The method of claim 1, wherein determining the location of the obscuration comprises determining a location of a temporary obscuration.

8. The method of claim 1, wherein capturing the image data of the field of regard comprises repositioning the transmitter or receiver mount through a plurality of positions so that the camera acquires image data from the entire field of regard.

9. The method of claim 1, wherein arranging the camera comprises arranging a pair of cameras on the transmitter or receiver mount;
   wherein capturing image data of the field of regard comprises capturing image data from each of the pair of cameras to generate pairs of images;
      wherein presenting the image to the user comprises presenting the pairs of images to the user via the user display device; and
      wherein receiving the user input comprises receiving the user input comprising a pair of indications of coordinates of the obscuration within the pair of images.

10. The method of claim 1, wherein a coordinate system for the coordinates relative to the transmitter or the receiver is the same coordinate system as the coordinate system for the coordinates relative to the vehicle.

11. The method of claim 1, wherein determining the location of the obscuration further comprises rectifying a pair of images that contain image data for the obscuration.

12. The method of claim 11, wherein the rectifying comprises projecting image data from each of the pair of images onto a common image plane.

13. The method of claim 12, wherein the rectifying further comprises providing one or more of a rotation or a skew adjustment to align the image data from each of the pair of images in the common image plane.

14. The method of claim 11 wherein the rectifying comprises a calibrated rectification.

15. The method of claim 11 wherein the rectifying comprises an uncalibrated rectification.

16. The method of claim 9, wherein determining the location of the obscuration further comprises rectifying a pair of images that contain image data for the obscuration from the pair of camera.

17. The method of claim 16, wherein the rectifying comprises projecting image data from each of the pair of images onto a common image plane.

18. The method of claim 17, wherein the rectifying further comprises providing one or more of a rotation or a skew adjustment to align the image data from each of the pair of images in the common image plane.

19. The method of claim 12 wherein the rectifying comprises a calibrated rectification.

* * * * *